(12) United States Patent
Hirose

(10) Patent No.: US 6,171,543 B1
(45) Date of Patent: Jan. 9, 2001

(54) ROCKER PANEL CONSTRUCTION

(75) Inventor: Toshio Hirose, Handa (JP)

(73) Assignee: Tokai Kogyo Co., Ltd., Aichi-Pref (JP)

( * ) Notice: Under 35 U.S.C. 154(b), the term of this patent shall be extended for 0 days.

(21) Appl. No.: 09/081,560

(22) Filed: May 19, 1998

Related U.S. Application Data

(60) Provisional application No. 60/083,573, filed on Apr. 30, 1998.

(51) Int. Cl.$^7$ .................................................. B29D 22/00
(52) U.S. Cl. ................................................ 264/572
(58) Field of Search ............................................. 264/572

(56) References Cited

U.S. PATENT DOCUMENTS

| | | | |
|---|---|---|---|
| 4,101,617 | 7/1978 | Friederich | 264/93 |
| 4,923,666 | 5/1990 | Yamazaki et al. | 264/572 |
| 5,015,166 | 5/1991 | Baxi | 425/149 |
| 5,032,345 | 7/1991 | Hendry | 264/572 |
| 5,069,859 | 12/1991 | Loren | 264/572 |
| 5,098,637 | 3/1992 | Hendry | 264/572 |
| 5,100,187 * | 3/1992 | Loren | 264/572 |
| 5,110,533 | 5/1992 | Hendry | 264/572 |
| 5,347,759 | 9/1994 | Kobayashi et al. | |
| 5,387,391 * | 2/1995 | Satoh et al. | 264/572 |
| 5,456,957 | 10/1995 | Jackson et al. | 428/31 |
| 5,514,427 | 5/1996 | Ellison et al. | 428/31 |
| 5,599,608 | 2/1997 | Yamamoto et al. | 428/192 |
| 5,635,117 * | 6/1997 | Fujioka et al. | 264/572 |
| 5,639,522 * | 6/1997 | Maki et al. | 428/31 |

FOREIGN PATENT DOCUMENTS

| | | |
|---|---|---|
| 8900053 | 3/1989 | (DE) . |
| 4316438 | 4/1994 | (DE) . |
| 0037587 | 10/1981 | (EP) . |
| 488121 | 6/1992 | (EP) . |

OTHER PUBLICATIONS

Press release, dated Dec. 3, 1990 "GAIN Technologies Announces Worldwide Breakthrough for Gas–Assisted Plastic Injection Molding", GAIN Technologies, Sterling Heights, Michigan.

\* cited by examiner

Primary Examiner—Mathieu D. Vargot
Assistant Examiner—Suzanne E. Mason
(74) Attorney, Agent, or Firm—Biebel & French

(57) ABSTRACT

An improved rocker panel construction includes a substantially convex show surface, a substantially concave hidden surface opposite the show surface, and a clip house mounting structure disposed on the hidden surface. The clip house structure includes a substantially planar clip surface, and substantially planar top and bottom legs attaching the clip surface to the hidden surface. The improvement consists of providing at least one hollow channel surrounded by a reinforcing rib connecting at least one of the legs to the hidden surface. The channel and reinforcing rib may run substantially longitudinally the length of the rocker panel. The channel and reinforcing rib provide a substantial increase in the strength of the attachment of the clip house mounting structure to the hidden surface while preventing the formation of sink marks in the show surface opposite the channel. The rocker panel may be made by gas-assisted injection molding wherein a mold including a mold cavity having the desired final shape, including one or more channel cavities, is provided. A predetermined amount of thermoplastic material is then injected into the mold cavity. Gas is injected into the one or more channel cavities at a predetermined pressure. The thermoplastic material is then allowed to set while the gas pressure is maintained.

2 Claims, 7 Drawing Sheets

ROCKER PANEL CONSTRUCTION

RELATED APPLICATION

This application claims the benefit of prior U.S. provisional application Ser. No. 60/083,573, filed on Apr. 30, 1998.

BACKGROUND OF THE INVENTION

1. Field of the Invention

The present invention relates to a method for making improved rocker panels and rocker panels made thereby.

2. Description of the Prior Art

A variety of injection molded parts are made and used for automobile body and trim parts. For example, bumpers, spoilers, body panels, doors, filler panels, wheel covers, dashboards, armrests, and other parts are commonly made by injection molding of thermoplastic materials. In addition, side sill garnishes, rocker panels, and rocker molds may be made by the injection molding process.

These plastic parts often have attachment means on their back or hidden sides in order to affix them to or mount them on an automobile. A common method of attaching plastic parts to automotive vehicles involves providing a plurality of clip houses on the backside of the plastic part. The clip houses are often molded on the backside of the part simultaneously with the molding of the part itself. The clip houses generally provide stand off surfaces to which mounting clips are attached. The plastic part may then be mounted on the automobile by aligning the mounting clips with corresponding holes or openings in the automobile, and pressing the plastic part into position. The mounting clips thereby exert a force to positively retain the plastic part against the automobile.

Plastic parts such as rocker panels, and the like, usually must withstand greater environmental stresses than other plastic parts. Rocker panels and side sill garnishes, for example, are usually attached to an automobile body below the door opening. Because of this position, these parts are subject to being stepped on by occupants entering and exiting the vehicle, road vibration, and being struck by foreign objects and debris. Thus, plastic parts intended for these applications require significantly stronger means for attaching them to the automobiles. One common method for providing stronger clip house mounting structures is to significantly thicken the legs of the clip house. However, as injection molded plastic cures, it tends to shrink. Where the clip house leg is joined to the backside of a plastic part, the observable effects of plastic shrinkage become more pronounced. The result is the appearance of a sink mark or line on the front surface of the plastic part opposite the attachment point for the clip house leg. As the clip house leg is thickened to provide additional support, the appearance of sink marks or lines becomes more pronounced. In plastic parts where an aesthetically pleasing external appearance is desired, the appearance of sink marks or lines is undesirable.

This is especially true where plastic parts are provided with a painted or other decorative surface such as by means of film lamination techniques. In such, film lamination techniques, a paint film laminate is co-molded over an external show face surface of the plastic part. The film laminate is typically pre-formed, inserted into a mold cavity, and a thermoplastic resin is injected under pressure into the mold cavity against the backside of the laminate. The result is a plastic part having a film laminate co-molded over a plastic substrate. Laminated paint films are detailed in U.S. Pat. No. 5,514,427, the entire disclosure of which is incorporated by reference herein. Techniques for preforming paint film laminates and insert molding film-plastic parts are disclosed in U.S. Pat. No. 5,599,608, the disclosure of which is incorporated herein by reference.

An additional problem with prior art methods of strengthening clip house attachment structures on plastic parts by thickening the support legs of the clip house structures is that they do not provide additional flexural rigidity to the plastic part. For example, many plastic parts, such as side sill garnishes and rocker panels, have substantial portions which are not supported along their back surfaces. These unsupported portions are subject to greater flexural deflections than adjoining supported portions. Repeated excessive flexing of the plastic parts can lead to the dulling of glossy finishes or the formation of visible cracks in external show face surfaces of the parts and may ultimately lead to fatigue and mechanical breakdown of the parts.

Accordingly, there remains a need in the art to improve the existing methods for strengthening attachment structures on the backsides of plastic parts for automobiles so as to prevent the formation of sink marks or lines on show face surfaces of the plastic parts.

Also, there remains a need in the art to improve the existing methods for reinforcing plastic parts for automobiles so as to provide for greater resistance to excessive flexing of the parts.

SUMMARY OF THE INVENTION

An improved rocker panel construction in accordance with the present invention comprises an injection molded plastic part including a substantially convex show surface and a substantially concave back or rear surface. The rocker panel may have a top show surface, a front show surface, a bottom show surface, and correspondingly a top hidden surface, a back or rear hidden surface, and a bottom hidden surface. Attachment means may comprise a clip house structure molded into the back of the rocker panel. The clip house structure includes a substantially planar clip attachment surface, a first or bottom leg connecting the clip surface to the rocker panel at the juncture where the back hidden surface adjoins the bottom hidden surface and a top or second leg connecting the clip surface to the top hidden surface. The improvement comprises a channel formed in the plastic where the bottom leg of the clip house structure joins the rocker panel such that the bottom leg essentially branches into two feet that connect to the rocker panel. Moreover, the channel runs substantially the length of the rocker panel along the joint between the back hidden surface and the bottom hidden surface.

The feet of the bottom leg substantially reduce or eliminate the occurrence of sink marks or lines in the show face surfaces of the rocker panel. Also, the channel adds strength to the structure and resists the tendency of a bottom portion of the rocker panel to flex or pivot with respect to a middle portion of the rocker panel about an axis coextensive with the juncture between the bottom portion, bounded by the bottom show surface and the bottom hidden surface, and the middle portion, bounded by the front show surface and the back hidden surface.

According to one embodiment, the rocker panel includes a show surface, a hidden surface disposed oppositely the show surface and a clip house mounting structure disposed on the hidden surface. The clip house mounting structure including a top leg and a bottom leg for connecting the clip house mounting structure to the hidden surface.

The rocker panel also includes a first reinforcing rib defining a first channel and a second reinforcing rib defining a second channel. The first reinforcing rib connects the first leg to the hidden surface while the second reinforcing rib connects the second leg to the hidden surface. Preferably, the first reinforcing rib straddles the juncture between the rear hidden surface and the bottom hidden surface to strengthen the rocker panel against flexure at that juncture. The second reinforcing rib preferably is positioned near an outer edge of said top hidden surface so as to align with the preferred position of the top leg. Where the rocker panel is formed by injection molding, the reinforcing ribs may include one or more sprue holes.

The improved rocker panel construction may be made by a method comprising the steps of providing a mold having at least a female mold member and a male mold member wherein the female mold member is substantially concave and has a top show surface, a front show surface, and a bottom show surface. The male mold member is substantially convex and has a top hidden surface, a front hidden surface, a bottom hidden surface, and a sprue for injecting plastic. The female mold member and the male mold member cooperate to define a mold cavity with the female mold member and male mold member further cooperating to define a channel cavity running substantially along the longitudinal length of the mold cavity. A predetermined amount of thermoplastic resin is injected through the sprue into the mold cavity. Then an inert gas is injected under pressure into the thermoplastic resin in the channel. The thermoplastic resin is then allowed to cure or set.

As a preliminary step, a preformed film laminate may be inserted into the mold prior to the injection of the thermoplastic resin so that the thermoplastic resin flows onto the back of the laminate and presses a show face surface of the laminate against the show surfaces of the female mold member.

The gas may be injected into the mold cavity in accordance with methods well known in the art. U.S. Patents representative of the art of injection molding with gas assistance are U.S. Pat. No. 4,101,617 to Friederich, U.S. Pat. No. 5,069,859 to Loren, and U.S. Pat. No. 5,110,533 to Hendry, all of which are expressly incorporated herein by reference.

Other objects and advantages of the invention will be apparent from the following detailed description, the accompanying drawings and the appended claims.

The invention will be further described in the following detailed description of a preferred embodiment.

DETAILED DESCRIPTION OF THE PREFERRED EMBODIMENT

Figure 1:
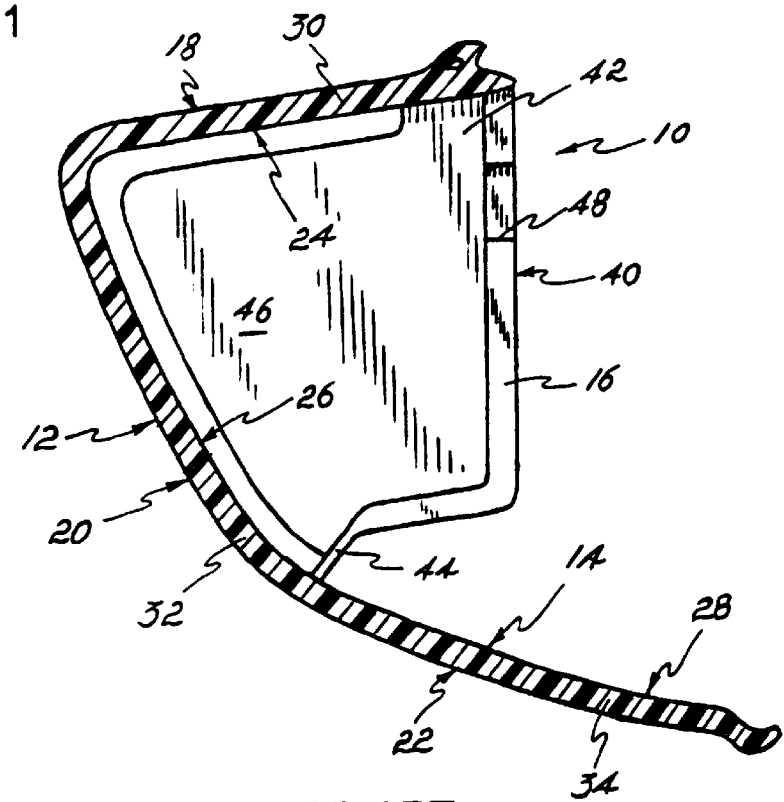
FIG. 1 is a transverse cross-sectional view of a rocker panel made in accordance with the prior art.

Turning first to FIG. 1, there is shown an automobile or truck rocker panel 10. The rocker panel 10 is composed of a plastic material and may have a paint film laminate (not shown) disposed over and covering any desired show surfaces. In many cases, the paint film laminate (not shown) comprising the show surface of the rocker panel is chosen to exactly match the color of the automobile or truck body (not shown).

As shown, rocker panel 10 comprises a generally convex show surface 12, a generally concave hidden surface 14, and a clip house mounting structure 16. The show face surface 12 includes a top show surface 18, a front show surface 20, and a bottom show surface 22. The hidden surface 14 includes a top hidden surface 24, a rear hidden surface 26, and a bottom hidden surface 28. Thus, the rocker panel 10 may be viewed as including a top portion 30, bounded by top show surface 18 and top hidden surface 24, a middle portion 32 bounded by the front show surface 20 and the rear hidden surface 26, and a bottom portion 34 bounded by the bottom show surface 22 and the bottom hidden surface 28.

The clip house mounting structure 16 includes a substantially planar clip mounting surface 40, a top leg 42 attaching the clip mounting surface 40 to the: top hidden surface 24, a bottom leg 44 attaching the clip house mounting structure 16 to the rocker panel 10 at the joint between the middle portion 32 and the bottom portion 34, a reinforcing flange 46 running from the top leg 42 to the bottom leg 44, and a clip retaining slot 48 disposed in the clip mounting surface 40 for holding a mounting clip (not shown) for attaching the rocker panel 10 to an automobile or truck underbody (not shown).

As may be seen in FIG. 1, the bottom leg 44 has been made thin relative to the thickness of the rocker panel 10 in the region of the joint between the middle portion 32 and the bottom portion 34 so as to prevent the formation of sink marks or lines on the show surface 12. However, the bottom leg 44 is prone to breaking due to repeated environmental stresses over time such as, for example, people stepping on the rocker panel while entering or exiting a vehicle, road vibration, and foreign objects and debris striking the rocker panel. Also, the bottom leg 44 does not prevent the unsupported bottom portion 34 from excessively flexing or pivoting relative to the middle portion 32 about the joint between the two portions.

Figure 2:
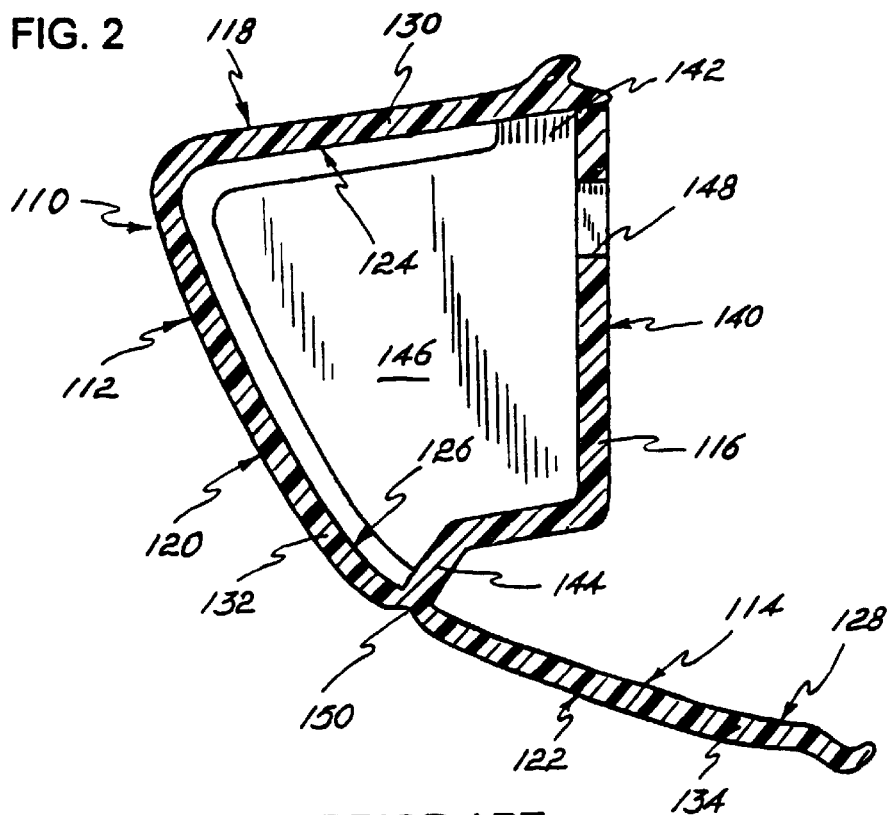
FIG. 2 is a transverse cross-sectional view of a second rocker panel made in accordance with the prior art.

Turning now to FIG. 2, there is shown another rocker panel 110 constructed in accordance with the prior art in an effort to overcome the preceding problems. The rocker panel 110 includes a substantially convex show surface 112, a substantially concave hidden surface 114, and a clip house mounting structure 116. The show surface 112 includes a top show surface 118, a front show surface 120, and a bottom show surface 122. The hidden surface 114 includes a top hidden surface 124, a rear hidden surface 126, and a bottom hidden surface 128. The rocker panel 110 may be divided into three portions, a top portion 130 defined by top show surface 118 and top hidden surface 124, a middle portion 132 defined by front show surface 120 and rear hidden surface 126, and a bottom portion 134 defined by bottom show surface 122 and bottom hidden surface 128.

The clip house mounting structure 116 includes a substantially planar clip mounting surface 140, a top leg 142 joining the clip mounting surface 140 to the top portion 130, a bottom leg 144 joining the clip house mounting structure 116 to the joint between the middle portion 132 and the bottom portion 134, a reinforcing flange 146 spanning the clip house mounting structure 116 from the top leg 142 to the bottom leg 144, and a clip retaining slot 148 for retaining a mounting clip (not shown).

It may be observed that the only difference between the prior art rocker panel 10 and the prior art rocker panel 110 is the provision of a substantially thicker bottom leg 144 on the rocker panel 110 for the purpose of strengthening the attachment of the clip house mounting structure 116 to the rocker panel 110. However, it may be seen that a sink mark 150 is formed on the show surface 112 opposite the attachment point of the bottom leg 144 as a result of the molten plastic shrinking as the plastic cures or sets. The sink mark 150 produces an aesthetically undesirable exterior appearance on the show surface 112. In addition, if a paint film laminate (not shown) is present over the show surface 112, an undesired variation in surface gloss may be present in the vicinity of the sink mark 150. Moreover, the resulting sink mark 150 introduces a site where increased mechanical stresses may be concentrated as the rocker panel 110 is subjected to environmental stresses. Also, the thickened bottom leg 144 provides no additional flexural rigidity or stiffness to prevent excessive bending or deflection of the bottom portion 134 relative to the middle portion 132 about the juncture between the two portions.

Figure 3:
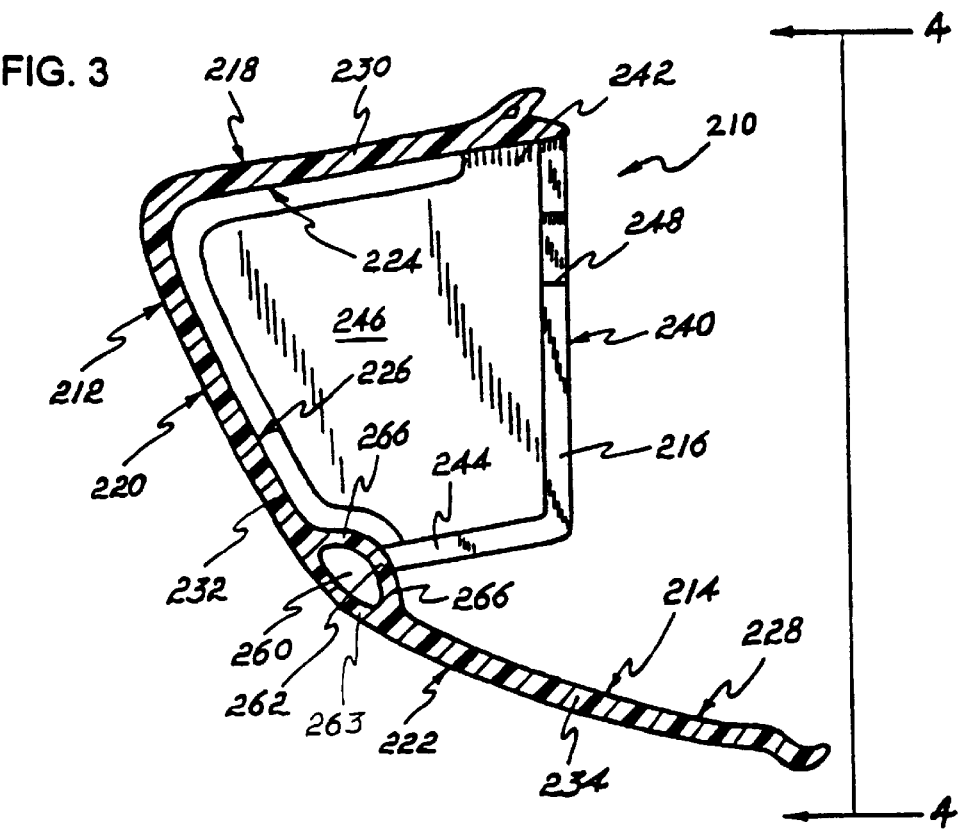
FIG. 3 is a transverse cross-sectional view of a rocker panel made in accordance with the instant invention.
Figure 4:
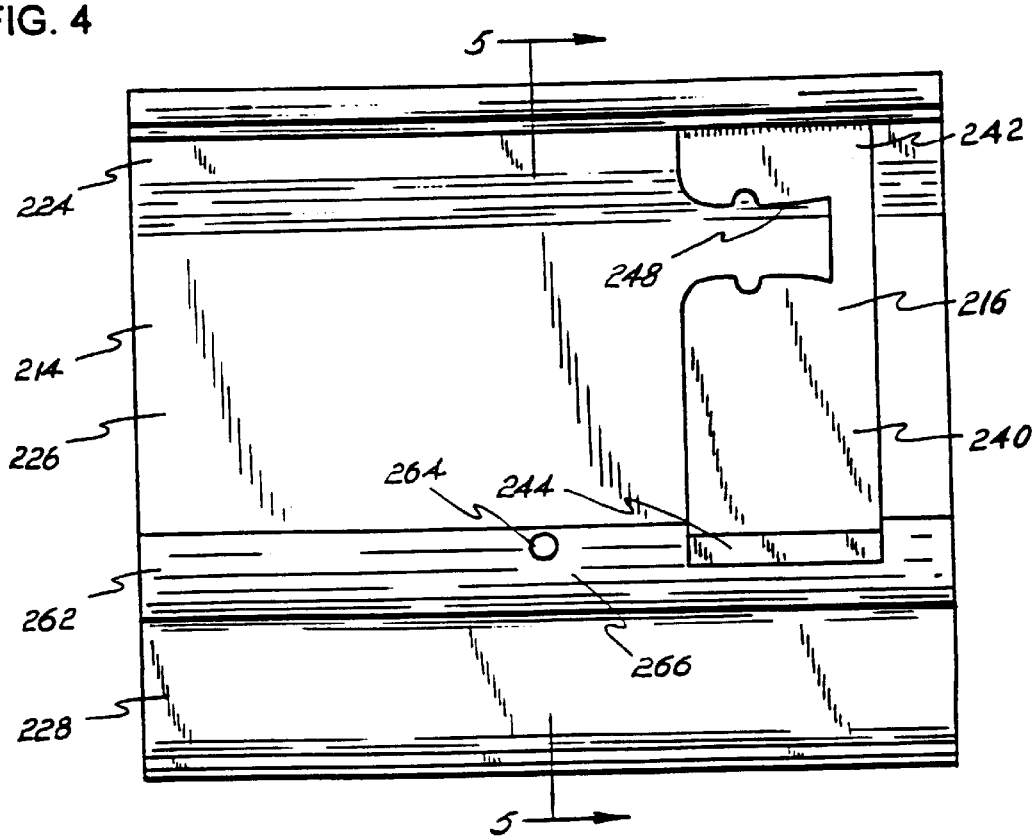
FIG. 4 is a rear elevation view of a longitudinal section of the rocker panel of FIG. 3.

Turning now to FIGS. 3 and 4, there may be seen a rocker panel 210 made in accordance with the present invention. The rocker panel 210 is an improvement over the prior art rocker panels 10 and 110, and includes a substantially convex show surface 212, a substantially concave hidden surface 214, and a clip house mounting structure 216. The show surface 212 includes a top show surface 218, a front show surface 220 and a bottom show surface 222 while the hidden surface 214 includes a top hidden surface 224, a rear hidden surface 226, and a bottom hidden surface 228. The rocker panel 210 is substantially divided into three portions comprising a top portion 230 bounded by top show surface 218 and top hidden surface 224, a middle portion 232 bounded by front show surface 220 and rear hidden surface 226, and a bottom portion 234 bounded by the bottom show surface 222 and the bottom hidden surface 228.

The clip house mounting structure 216 comprises a substantially planar clip mounting surface 240 for confronting an attachment surface of an automotive vehicle, a top leg 242 for connecting the clip house mounting structure 216 to the top portion 230, a bottom leg 244 for connecting the clip house mounting structure 216 to a rear portion of the rocker panel 210, a reinforcing flange 246 spanning the clip house mounting structure 216 from the top leg 242 to the bottom leg 244, and a clip retaining slot 248 for retaining a mounting clip (not shown).

The improvement to the rocker panel 210 in accordance with the present invention comprises the provision of a channel 260 bounded by a portion of the show surface 212 and a reinforcing rib 262. The channel 260 and the reinforcing rib 262 run substantially longitudinally along the length of the rocker panel 210 straddling the juncture 263 between the middle portion 232 and the bottom portion 234. The bottom leg 244 attaches to and is integral with the reinforcing rib 262. In FIG. 4 a sprue hole 264, left over from the injection molding process, is visible in a rear portion of the reinforcing rib 262.

It may be seen that the provision of the channel 260 and associated surrounding reinforcing rib 262 result in an improved rocker panel construction 210 that has substantially no sink marks or lines visible on the exterior show surface 212. Furthermore, the bottom leg 244 effectively branches into two feet 266 whose combined thickness is substantially equal to or greater than the thickness of the bottom leg 244. Thus, it may be seen that the clip house mounting structure 216 is supported substantially more strongly than in prior art rocker panels. Also, the reinforcing rib 262 bounding the channel 260 forms a member that resists the deflection or rotation of the bottom portion 234 relative to the middle portion 232 about a longitudinal axis substantially coextensive with the juncture 263 between the bottom portion 234 and the middle portion 232.

Figure 5:
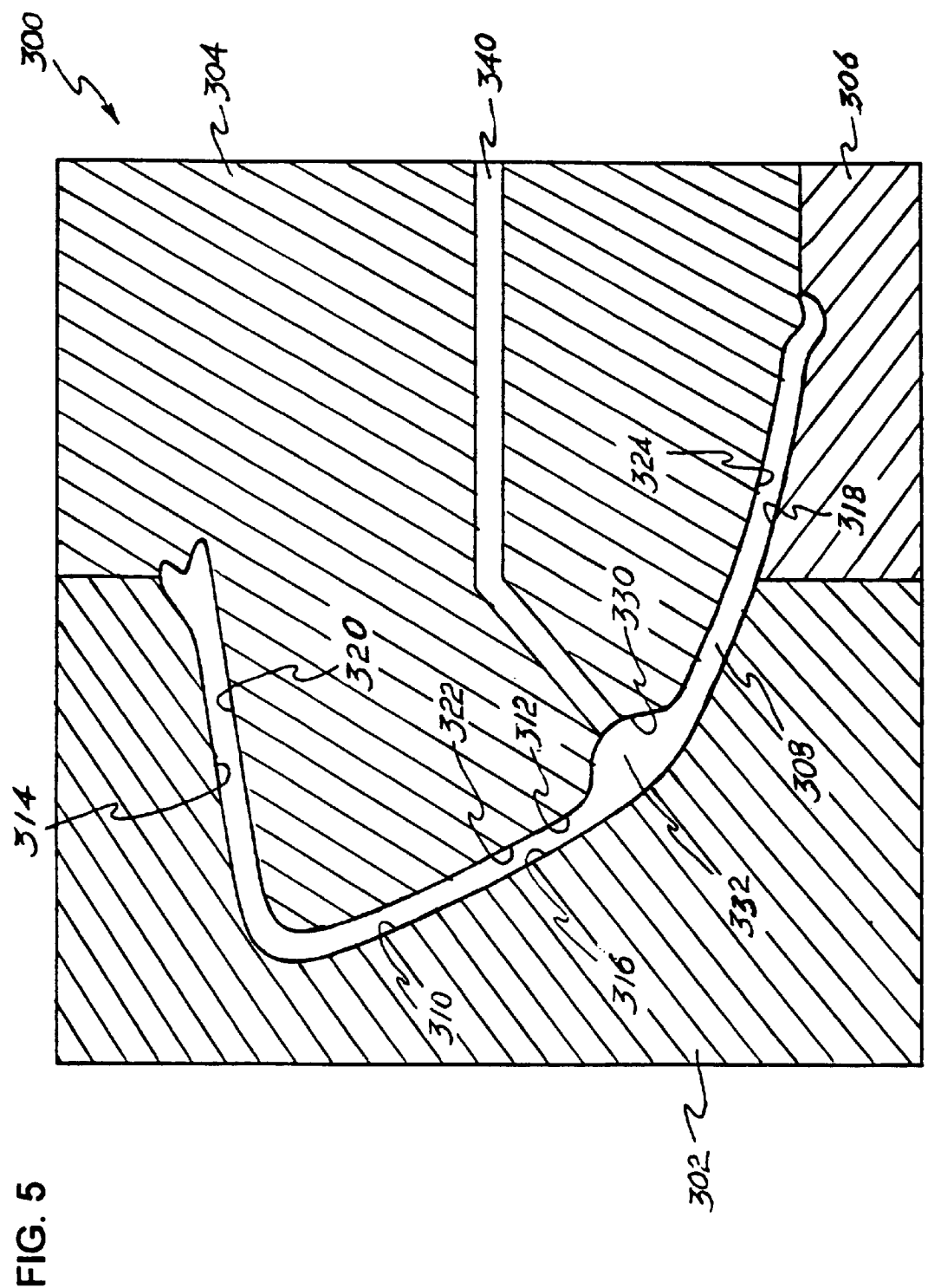
FIG. 5 is a transverse cross-sectional view of a mold used to injection mold the rocker panel of FIGS. 3 and 4 shown at that portion of the mold corresponding to the rocker panel part at the location shown by the lines and arrows 5—5 of FIG. 4.

Turning now to FIG. 5, there may be seen a mold 300 for making the rocker panel 210 of the present invention. The mold 300 comprises a female mold member 302, a male mold member 304, and a bottom mold member 306. The precise number and arrangement of mold members will depend upon the desired shape of the rocker panel, or other automotive part, the thermoplastic material used, and the type of injection molding process used. Although a three part mold is shown here, the part could easily be made in a two part mold.

The mold members 302, 304, and 306 cooperate to define a mold cavity 308. The mold cavity 308 is bounded by a substantially concave show surface 310 and a substantially convex hidden surface 312. The show surface 310 includes a top show surface 314, a front show surface 316 and a bottom show surface 318. The hidden surface 312 includes a top hidden surface 320, a rear hidden surface 322, and a bottom hidden surface 324. The hidden surface 312 further has a channel surface 330 that substantially defines a channel cavity 332 that is in turn included within the mold cavity 308. The male mold member 304 includes a sprue 340 in fluid communication with the mold cavity 308 for injecting thermoplastic material and an inert gas into the mold cavity 308. While the preferred embodiment of the invention shows a sprue for injecting both thermoplastic material and a gas, separate sprues may be provided for injecting solely thermoplastic material or gas, provided that a means for injecting gas is in fluid communication with the channel cavity 332.

A preferred method of making the rocker panel 210 of the present invention comprises providing the mold 300 of FIG. 5, including a show surface 310, a hidden surface 312, and a mold cavity 308 defined by the show surface 310 and the hidden surface 312, a channel-defining surface 330 contiguous with the hidden surface 312 defining a channel cavity 332, and at least one sprue 340 in fluid communication with the channel cavity 332, injecting a predetermined amount of thermoplastic resin under pressure through the sprue 340 into the mold cavity 308, stopping the flow of thermoplastic resin, injecting a predetermined amount of nonreactive gas under pressure through the sprue 340 into the channel cavity 332, allowing the thermoplastic resin to cure or set, and removing the cured thermoplastic resin from the mold.

To remove the rocker panel 210 from the mold 300, the bottom mold member 306 is first lowered from the completed rocker panel 210. The female mold member 302 is then separated from the male mold member 304 to reveal the rocker panel 210. Next, the portion of the male mold member 304 containing the sprue 340 may be separated from the rocker panel 210. If need be, the male mold member 304 may be withdrawn from the rocker panel 210 in sections to free the complex shape of the clip house mounting structure 216. If desired, the mold 300 may be provided with a cutting member (not shown) for separating the sprue material from the rocker panel 210 or venting the gas from the channel 260.

The method of the preferred embodiment produces the rocker panel 210 (see FIG. 3) having the channel 260 surrounded or defined substantially by the hidden surface 214 and the reinforcing rib 262. The channel 260 and the reinforcing rib 262 connect the bottom leg 244 to the hidden surface 214 such that the bottom leg 244 effectively branches or divides into two feet 266 joined to the hidden surface 214.

The thickness of the reinforcing rib 262, the type and amount of thermoplastic material, and the gas pressure are chosen such that the thermoplastic material cures without producing sink marks in the show surface 212 opposite the bottom leg 244 or the feet 266. Preferably, the channel 260 and reinforcing rib 262 run substantially along the entire length of the rocker panel 210, but may be limited to shorter runs, or even confined to an area immediately under the bottom leg 244. Although the preferred embodiment is shown with a single channel 260 and reinforcing rib 262 disposed in the bottom leg 244, a channel and reinforcing rib may be provided between the top leg 242 and the hidden surface 214, or between other clip house mounting structure 216 attachment points and the hidden surface 214.

Suitable thermoplastic resins that may be used in the process of the instant invention include, without limitation, thermoplastic olefin and acrylonitrile butadiene-styrene. Additional suitable thermoplastic materials may include, for example, polyvinyl chloride, polycarbonate, polystyrene, polyethylene, polypropylene, polyethylene terephthalate-glycol, nylon, and RIM urethanes. Polyolefin homopolymers and copolymers are inexpensive thermoplastic resins which have excellent molding properties and may also be mentioned as being suitable for use.

The above injection molding process is known generally to those with skill in the art of gas-assisted injection molding as "full shot" injection molding. Alternatively, the improved rocker panel of the instant invention may be molded by means of a "short shot" method wherein a predetermined amount of thermoplastic material is first injected into the mold cavity, and then a predetermined amount of a gas is injected simultaneously with the remaining amount of thermoplastic material necessary to fill out the mold. While nitrogen is the preferred gas for use in gas-assisted injection molding, other inert or relatively nonreactive gases may be used as well.

In addition, as a preliminary step, a laminate such as, for example, a paint film laminate, may be preformed and inserted into the mold prior to the step of injecting the thermoplastic resin such that the thermoplastic resin is deposited against a rear surface of the laminate thereby pressing a show surface of the laminate against the show surface of the mold. The resulting plastic part has a show or decorative surface fused or bonded over a plastic substrate, and is substantially free of sink marks and other undesired depressions.

Figure 6:
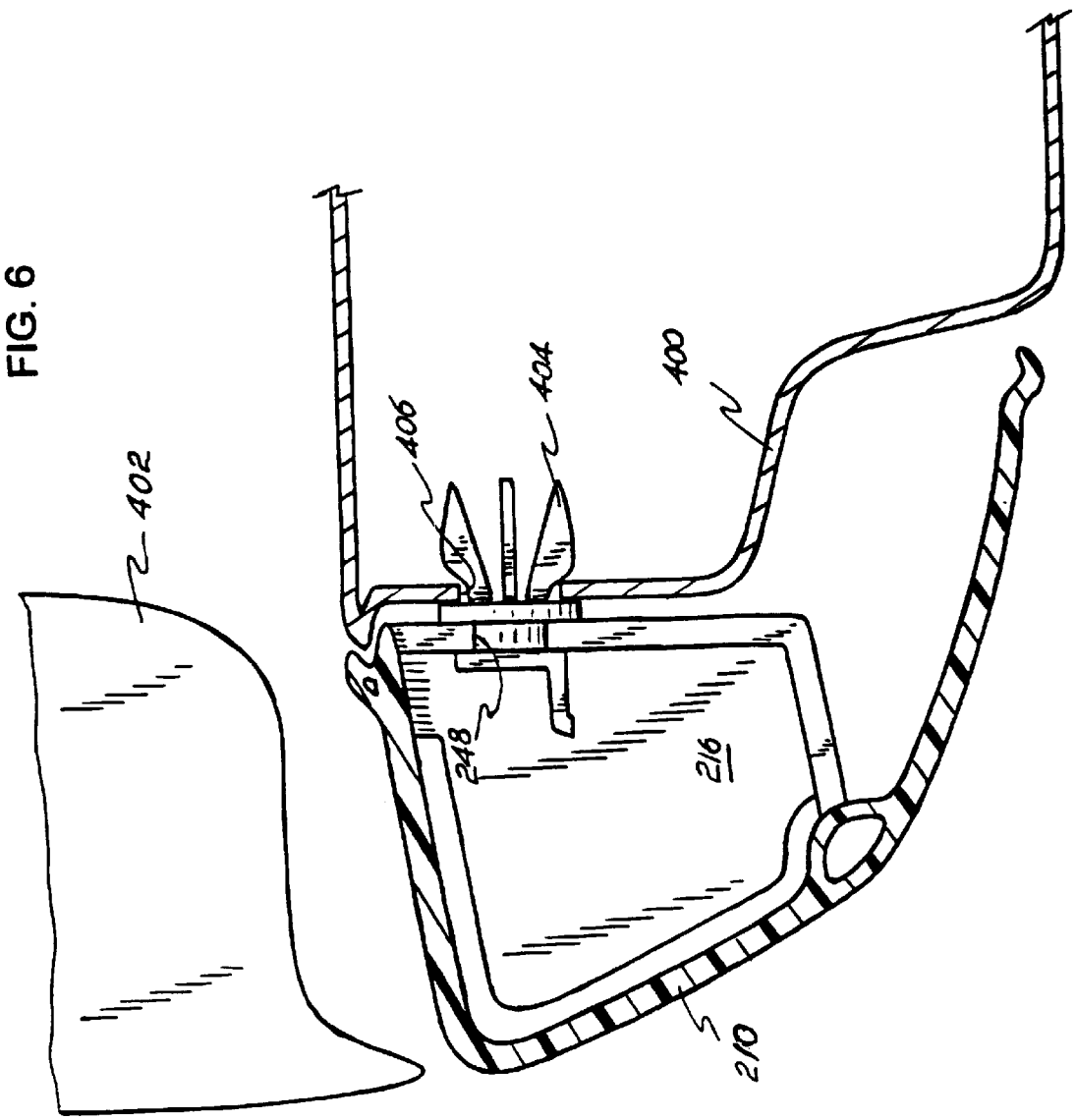
FIG. 6 is a transverse cross-sectional view of the rocker panel of FIGS. 3–4 shown installed in its intended application on an underbody of an automobile.

Turning now to FIG. 6, the rocker panel 210 made in accordance with the present invention may be seen installed in its intended application. As shown, the rocker panel 210 is mounted to an automobile underbody 400 at a location positioned under a door 402 when the door is in its closed position. The rocker panel 210 may be provided with a desired number of clip house mounting structures 216 located at desired positions along the length of the rocker panel 210. Mounting clips 404 are inserted into clip retaining slots 248. The mounting clips 404 are then aligned with corresponding mounting holes 406 in the automobile underbody, and force is applied to the rocker panel 210 to drive the mounting clips 404 through the mounting holes 406. The rocker panel 210 is thereby securely attached to the automobile underbody 400 by the positive retaining action of the mounting clips 404.

Figure 7:
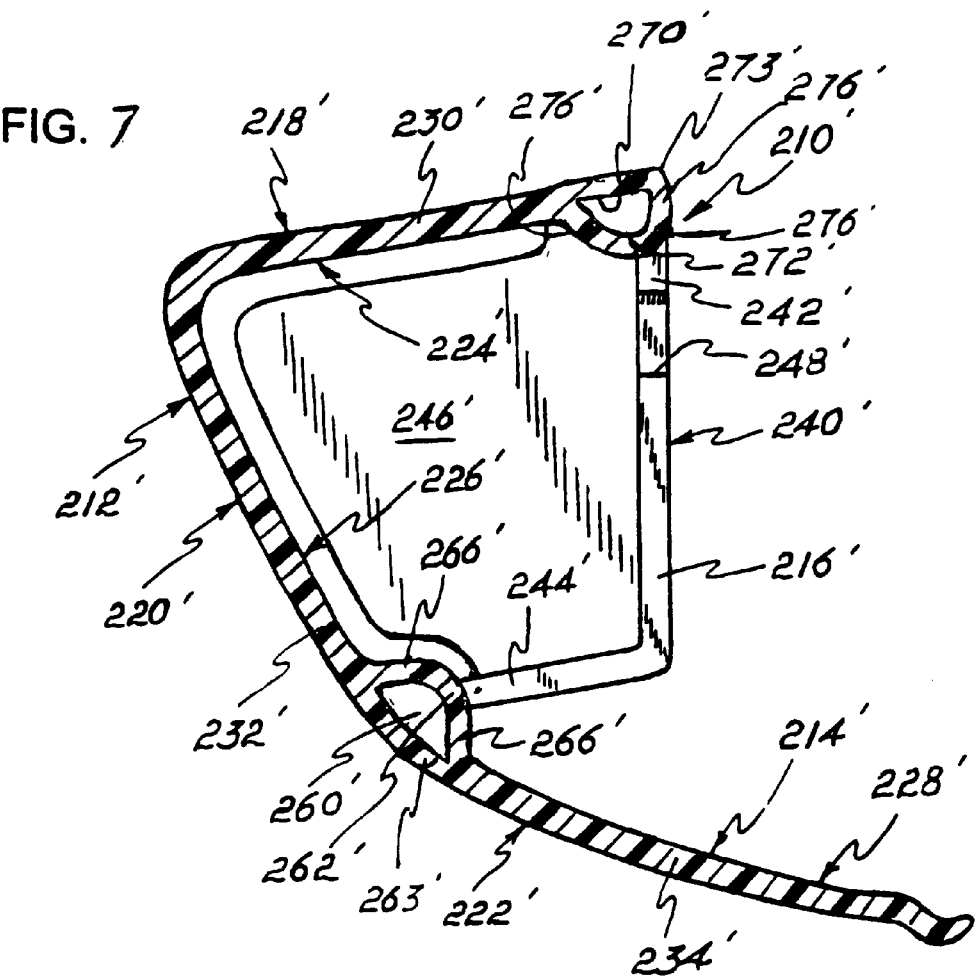
FIG. 7 is a transverse cross-sectional view of another embodiment of a rocker panel made in accordance with the instant invention.

Turning now to FIG. 7, there may be seen another embodiment of a rocker panel 210' made in accordance with the present invention. The rocker panel 210' includes a substantially convex show surface 212', a substantially concave hidden surface 214', and at least one clip house mounting structure 216'. The show surface 212' includes a top show surface 218', a front show surface 220' and a bottom show surface 222' while the hidden surface 214' includes a top hidden surface 224', a rear hidden surface 226', and a bottom hidden surface 228'. The rocker panel 210' is substantially divided into three portions comprising a top portion 230' bounded by top show surface 218' and top hidden surface 224', a middle portion 232' bounded by front show surface 220' and rear hidden surface 226', and a bottom portion 234' bounded by the bottom show surface 222' and the bottom hidden surface 228'.

The clip house mounting structure 216' comprises a substantially planar clip mounting surface 240' adapted for attachment to an attachment surface of an automotive vehicle, a top or second leg 242' for connecting the clip house mounting structure 216' to the top portion 230', a bottom or first leg 244' for connecting the clip house mounting structure 216' to a rear portion of the rocker panel 210', a reinforcing flange 246' spanning the clip house mounting structure 216' from the top leg 242' to the bottom leg 244', and a clip retaining slot 248' for retaining a mounting clip (not shown).

The improvement to the rocker panel 210' in accordance with the present invention comprises the provision of a first channel 260', which is bounded by a portion of the show surface 212' and a first reinforcing rib 262', and a second channel 270', which is bounded by a portion of the show surface 212' and a second reinforcing rib 272'. The first channel 260' and the first reinforcing rib 262' run substantially longitudinally along the length of the rocker panel 210' straddling the juncture 263' between the middle portion 232' and the bottom portion 234'. The bottom or first leg 244' attaches to and is integral with the first reinforcing rib 262'. The second channel 270' and the second reinforcing rib 272' also run substantially longitudinally along the length of the rocker panel 210', but are positioned near an outer edge 273' of the top portion 230'. The top or second leg 244' attaches to and is integral with the second reinforcing rib 272'.

The first reinforcing rib 262' effectively branches into two feet 266' whose combined thickness is substantially equal to or greater than the thickness of the bottom leg 244'. Likewise, the second reinforcing rib 272' effectively branches into two feet 276' whose combined thickness is substantially equal to or greater than the thickness of the top leg 242'.

Figure 8:
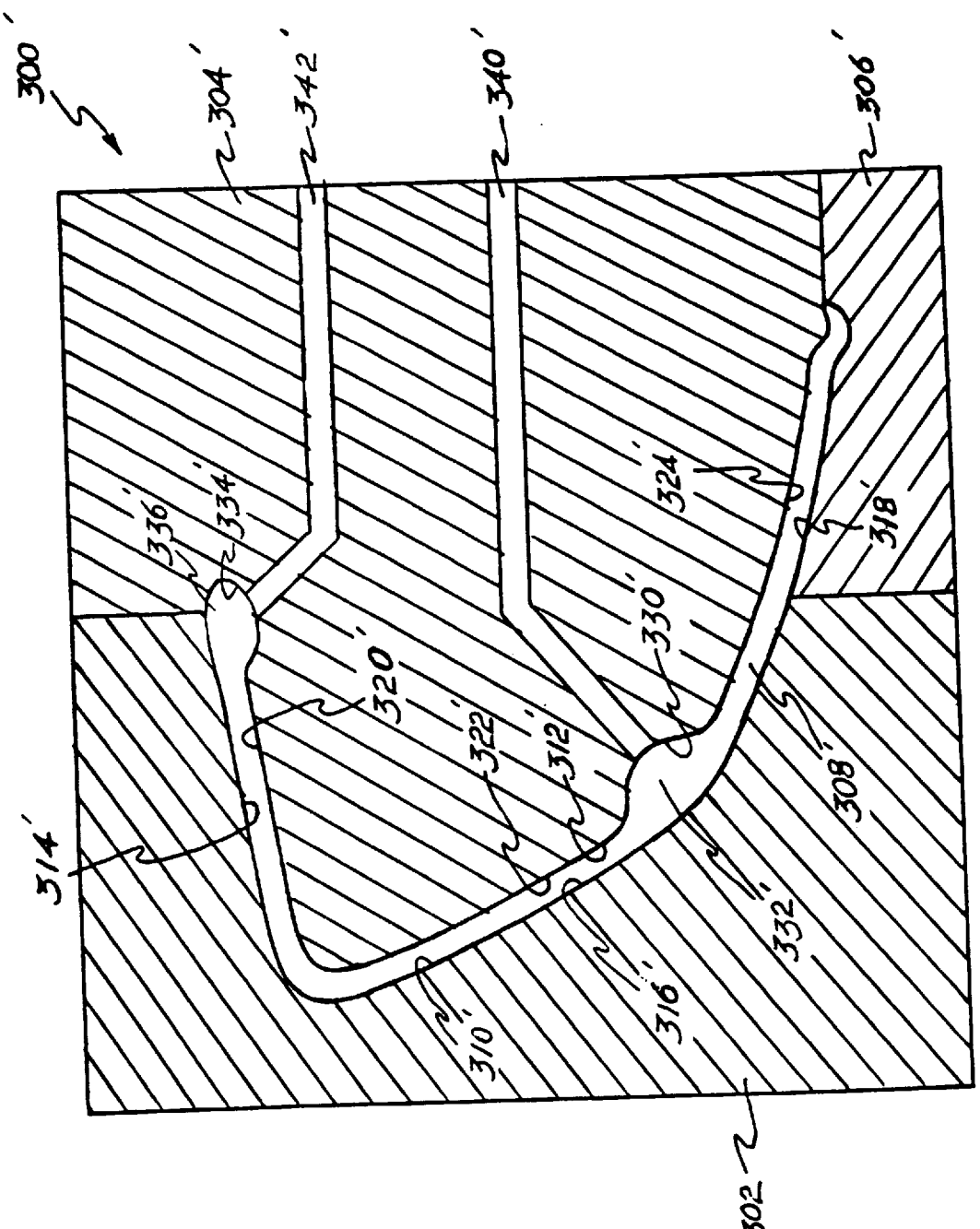
FIG. 8 is a transverse cross-sectional view of a mold used to injection mold the rocker panel of FIGS. 3 and 4 shown at that portion of the mold corresponding to a line through the rocker panel taken between adjacent clip house mounting structures.

Turning now to FIG. 8, there may be seen a first sectional view of a mold 300' for making the rocker panel 210' of the present invention, taken along a line corresponding to a section of the rocker panel 210' running between adjacent clip house mounting structures 216'. The mold 300' comprises a female mold member 302', a male mold member 304', and a bottom mold member 306'. The precise number and arrangement of mold members will depend upon the desired shape of the rocker panel, or other automotive part, the thermoplastic material used, and the type of injection molding process used. Although a three part mold is shown here, the part could easily be made in a two part mold.

The mold members 302', 304', and 306' cooperate to define a mold cavity 308'. The mold cavity 308' is bounded by a substantially concave show surface 310' and a substantially convex hidden surface 312'. The show surface 310' includes a top show surface 314', a front show surface 316' and a bottom show surface 318'. The hidden surface 312' includes a top hidden surface 320', a rear hidden surface 322', and a bottom hidden surface 324'.

The hidden surface 312' further has a first channel surface or first elongated depression 330' contiguous with the substantially convex hidden surface 312'. The elongated depression 330' substantially defines a first channel cavity or first rib-forming space 332' and a second channel surface or first elongated depression 334' that substantially defines a second channel cavity or second rib-forming space 336'. The male mold member 304' includes a first sprue 340' in fluid communication with the first rib forming space 332' and a second sprue 342' in fluid communication with the second rib-forming space 336'. While only two sprues 340', 342' are shown, additional sprues (not shown) may be provided to inject either resin (not shown) or pressurized gas (not shown) into selected locations in the mold cavity 308'.

Figure 9:
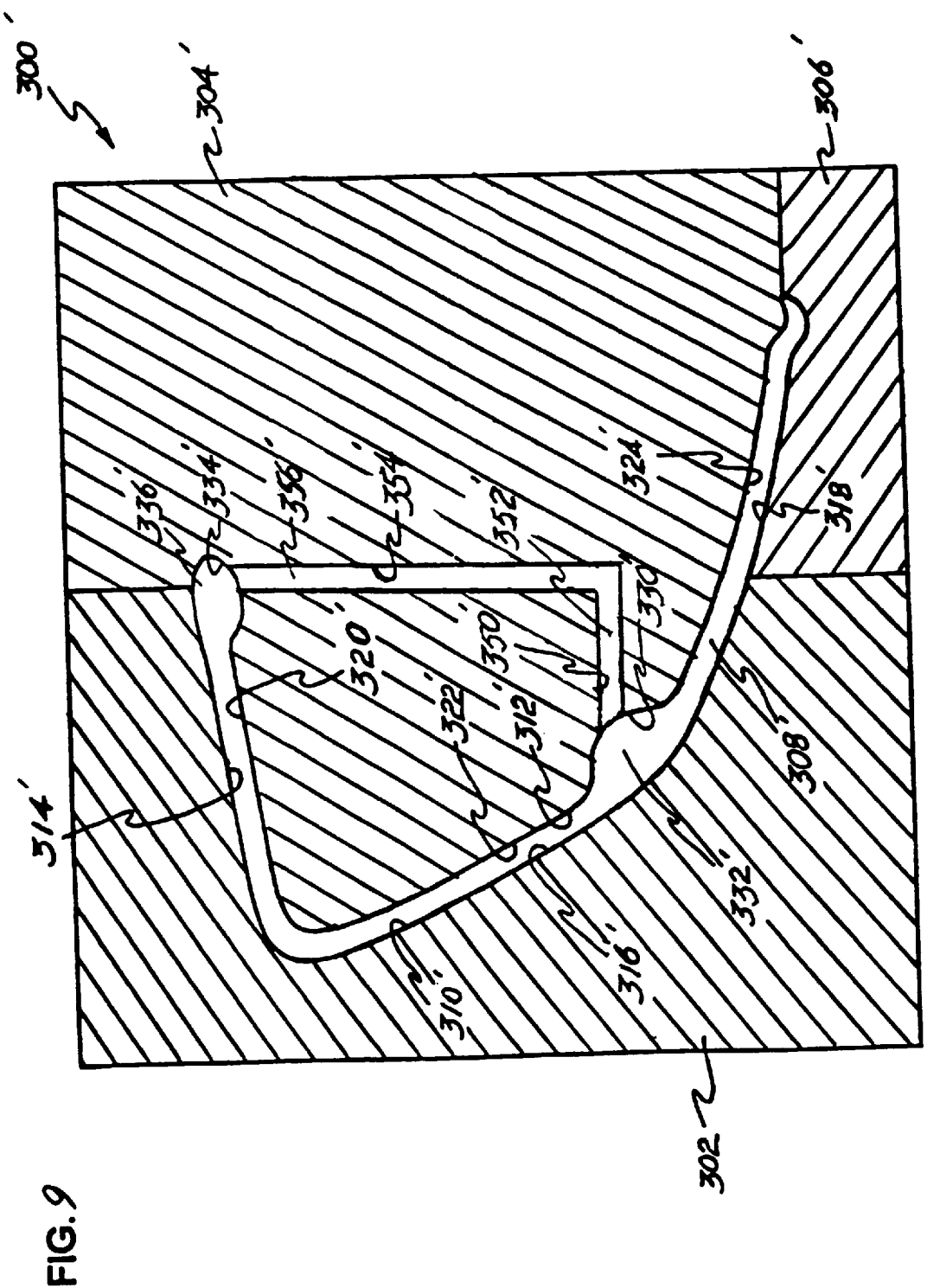
FIG. 9 is a transverse cross-sectional view of a mold used to injection mold the rocker panel of FIG. 7 shown at that portion of the mold corresponding to a line through the rocker panel taken through a clip house mounting structure.

Turning now to FIG. 9, there is shown a second sectional view of the mold 300', this section corresponding to a section of the rocker panel 210' (FIG. 7) running through the clip house mounting structure 216'. The section of FIG. 9 shows a first recess 350' defining a first leg-forming space or bottom leg cavity portion 352' for forming the bottom or first leg 244' (FIG. 7) and a second recess 354' defining a second leg-forming space or top leg cavity portion 356' for forming the top or second leg 242'. As shown in FIG. 9, the first and second leg-forming spaces 352', 356' are in fluid communication to the first and second rib-forming spaces 332', 336' so as to effect connection of the bottom and top legs 244', 242' to the first and second reinforcing ribs 262', 272' in the finished rocker panel part 210'.

A preferred method of making the rocker panel 210' (FIG. 7) of the present invention comprises providing the mold 300' of FIG. 7; injecting a predetermined amount of thermoplastic resin (not shown) under pressure through the sprue 340' (FIG. 8) into the mold cavity 308'; stopping the flow of thermoplastic resin; injecting a predetermined amount of nonreactive gas (not shown) under pressure through the sprues 340', 342' (FIG. 8) into the first and second rib-forming spaces 332', 336' to generate gas pressure in those spaces; solidifying the resin by allowing it to cure or set in the mold cavity 308' under controlled temperature conditions while maintaining the gas pressure in the first and second rib-forming spaces 332', 336'; and removing the cured thermoplastic part 210' (FIG. 7) from the mold. A paint film laminate (not shown) may be positioned along the show surface 316' of the mold cavity 308' before the resin is injected into the mold cavity 308' to form a decorative surface on the finished rocker panel 210'.

Thermoplastic resins suitable for use in making the rocker panel 210 (FIGS. 3 and 4) are likewise suitable for making the rocker panel 210' (FIG. 7). While the thermoplastic resin (not shown) could be injected through either the first sprue 340' (FIG. 8) or the second sprue 342' (FIG. 8), it is preferably injected into the mold cavity 308' through the first sprue 340' because the central position of the first rib-forming space 332' into which the first sprue 340' with respect to the mold cavity 308' promotes even filling of the mold cavity 308'. The finished rocker panel 210' (FIG. 7) is removed from the mold 300' in a manner similar to that in which the rocker panel 210 (FIGS. 3 and 4) is removed from the mold 300 (FIG. 5).

The addition of the second reinforcing rib 272' improves the attachment of the top leg 242' to the top hidden surface 224' and further strengthens the rocker panel 210' against deflection when installed on an automobile (not shown) in a manner similar to the manner in which the rocker panel 210 (FIGS. 3 and 4) is installed on an automobile, as shown in FIG. 6.

The preceding description and accompanying drawings are intended to be illustrative of the invention and not in any sense limiting. Various other modifications and applications will be apparent to those skilled in the art without departing from the true spirit and scope of the invention as defined literally by the claims and their equivalents.

What is claimed is:

1. A method of making a rocker panel for a motor vehicle, said rocker panel including a show surface, a hidden surface opposite said show surface, and at least one clip house mounting structure including a top leg and a bottom leg for connecting said clip house mounting structure to said hidden surface, comprising the steps of:

providing a mold, said mold including a mold cavity shaped like said rocker panel, a show surface corresponding to said rocker panel show surface, a hidden surface corresponding to said rocker panel hidden surface, a top leg cavity portion corresponding to said top leg, a bottom leg cavity portion corresponding to said bottom leg, a first channel-defining surface defining a first channel cavity, said first channel-defining surface being in fluid communication with said bottom leg cavity portion and contiguous with said hidden surface, and at least one sprue in fluid communication with said first channel cavity;

injecting a predetermined amount of thermoplastic material into said mold cavity;

injecting a predetermined amount of gas into said first channel cavity to form a first strength enhancing rib to resist the tendency of said panel to flex or pivot thereat when said rocker panel is stepped on; and allowing said thermoplastic material to set.

2. A method as recited in claim 1 further comprising providing said mold cavity with a second channel defining surface defining a second channel cavity, said second channel defining surface being in fluid communication with said top leg cavity portion and contiguous with said hidden surface and wherein said sprue is in communication with said second channel cavity, and injecting a predetermined amount of gas into said second channel cavity to form a second strength enhancing rib to resist the tendency of said panel to flex or pivot thereat upon said rocker panel being stepped on.

* * * * *